July 5, 1955  D. M. DICKINSON  2,712,639

BATTERY TERMINAL CONNECTION

Filed June 9, 1953

INVENTOR
Dwight M. Dickinson
BY Nathaniel Frucht
ATTORNEY

United States Patent Office 2,712,639
Patented July 5, 1955

2,712,639

BATTERY TERMINAL CONNECTION

Dwight M. Dickinson, North Providence, R. I.

Application June 9, 1953, Serial No. 360,430

5 Claims. (Cl. 339—225)

This is a continuation in part of application Serial No. 231,571, filed June 14, 1951, entitled Battery Terminal Connection.

The present invention relates to terminal connections for attachment to the posts of storage batteries such as used on automobiles for ignition, lighting and starting.

The principal object of the invention is to provide a terminal connection to which a cable end may be detachably secured without sweating or soldering.

Another object of the invention is to provide an emergency terminal connection which is easily attached when a temporary breakdown in a battery terminal connection occurs.

An additional object of the invention is to provide an emergency terminal connection which may be safely applied for heavy vehicles carrying inflammable materials.

With the above and other objects and advantageous features in view, the invention consists of a novel arrangement of parts more fully disclosed in the detailed description following, in conjunction with the accompanying drawings, and more specifically defined in the claims appended thereto.

It has been found desirable to provide a terminal connection which may be applied for quickly and temporarily connecting a cable to the battery of a heavy vehicle transportating inflammable material in cases of emergencies due to a breakdown in the cable connection. To this end, I have devised a terminal connection which uses a ring provided with a stud and a channel member with two abutments extending outwardly on each side of the stud and on different planes, the abutment nearest the top of the stud being relatively flat on its face and functioning as a stop abutment, and the second abutment having gripping teeth and notches which function to grip a cable. I provide a base with a socket having internal corrugations and which slidably receives the end of a cable, whereby the tip of the cable is seated under the tooth abutment and is securely wedged thereunder and gripped between the gripping teeth, the notches and the corrugations as the stud is drawn up into the base by threading a nut thereon. With the cable securely attached to the connection in this manner, the ring may then be mounted on the battery post to fuurnish the electrical system with the necessary current for operation of the vehicle motor. The two parts thus cooperate to grip both the cable tip and the battery post, thus providing firm electrical contacts.

Figure 1:
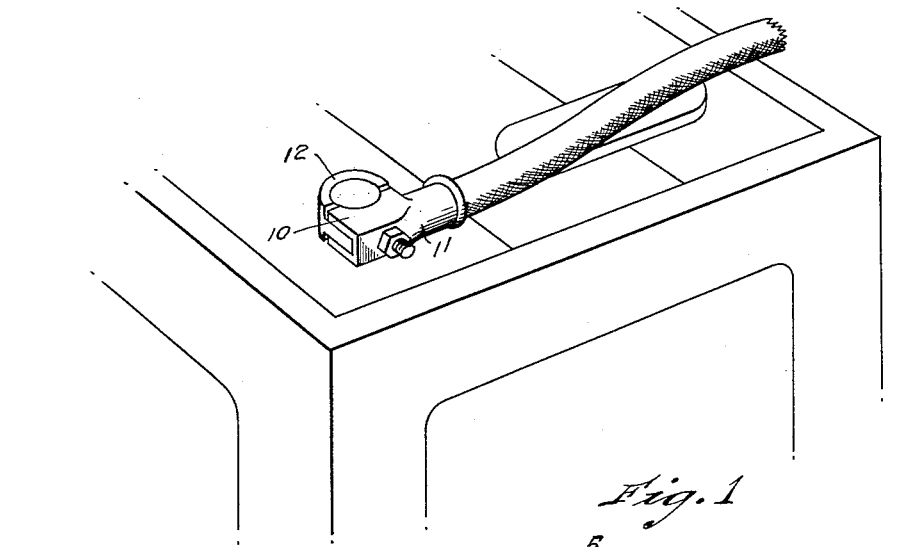
Fig. 1 is a perspective view of the novel terminal connection, as connected to a cable end and mounted on a battery terminal.
Figure 3:
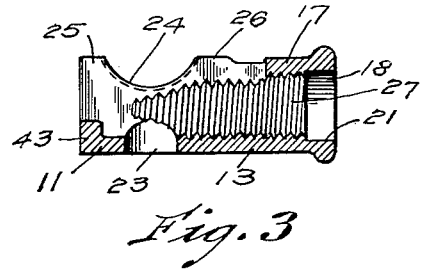
Fig. 3 is a sectional view of the base of the connection.
Figure 5:
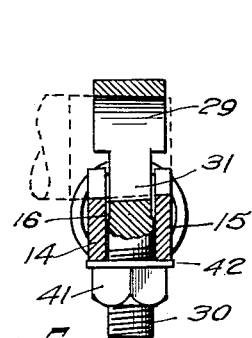
Fig. 5 is a sectional view on the line 5—5 of Fig. 2.

Referring to the drawings, the terminal connection 10 includes a base 11 and a ring grip element 12. The base 11 is of channel shape, see Figs. 1 and 5, with a top wall 13 and side walls 14, 15 forming an elongated chamber 16; a socket portion 17 communicates with the chamber and has an inlet 18 into which a cable end 19 may be mounted with its tip portion 20 extending into the chamber 16. The inlet 18 of the socket is recessed as indicated at 21 to receive the cable insulation 22. The top wall 13 has a stud receiving opening 23 and the side walls 14, 15 each have an arcuate lower edge 24 extending between spaced abutment elements 25, 26. Corrugations 27 line the inside of the socket and extend into the walls of the chamber as far as the stud receiving opening 23, the corrugations being preferably screw cut.

Figure 2:
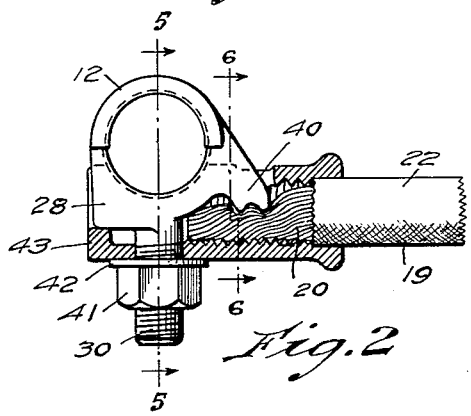
Fig. 2 is an enlarged sectional view of the terminal and cable, as mounted on a battery post.
Figures 4, 6:
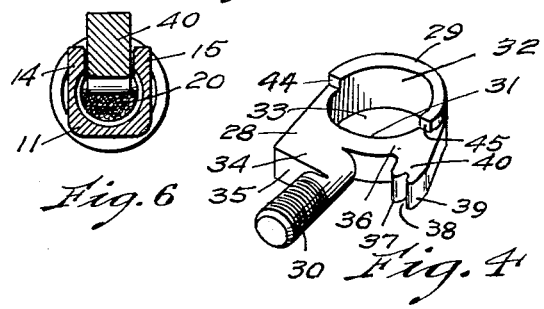
Fig. 4 is a perspective view of the gripping element of the connection.
Fig. 6 is a sectional view on the line 6—6 of Fig. 2.

The ring member includes an upper generally solid section 28, a lower arcuate section 29, and a threaded stud 30 extending outwardly from the upper section, the inner surfaces of the upper and lower sections being arcuately recessed as indicated by the reference numerals 31, 32 to provide an elongated oval 33 having circular upper and lower portions. One part 34 of the upper section 29 extends outwardly from the stud and has a flat upper surface 35, this part providing a stop abutment against the inner surface of the base upper wall 13; another part 36 of the upper section in the plane of the part 34 is displaced towards the lower section and flares outwardly, and has two depending teeth 37, 38 separated by a small notch 39, and a larger notch adjacent the stud as shown in Figs. 2 and 4, whereby a gripping abutment 40 is provided in cooperation with the corrugations to firmly grip and press the cable tip towards the base upper wall when a lock nut 41 is mounted on the stud over a split washer 42 and the parts are drawn together. If desired, a stop lug 43 may be provided on the base top wall, to provide a seal. The upper section 28 is of less width than the lower section 29, thus providing spaced abutments 44, 45 at each side, as shown in Fig. 4 in alignment with the side wall abutment elements 25 and 26.

When attaching the cable to the terminal connection, the lock nut 41 is loosened sufficiently to allow the grip member to mount over a battery terminal post. The cable tip portion 20 is then slipped underneath the abutment 40. The nut 41 is now tightened and the grip member is drawn upwardly into the base to firmly grip onto the terminal post while at the same time, the gripping teeth and the corrugations press into the cable tip, which becomes securely gripped between the solid section 28 and the base upper wall.

Figure 7:
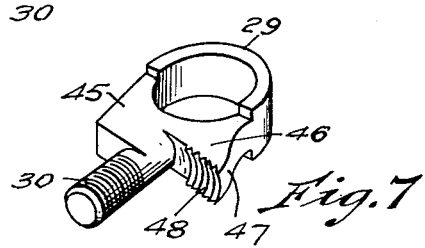
Fig. 7 is a view similar to Fig. 4, showing a modified gripping element construction.

For certain cable construction it may be desirable to provide a grip element 45 with an upper inclined grip abutment 46 having a concave surface 47 with a plurality of grip teeth 48 as illustrated in Fig. 7.

It is now clear that my novel battery terminal connection may be quickly and easily used to replace broken down terminal connections without sweating or soldering the cable in place. This is especially advantageous when the cable of a vehicle carrying inflammable material breaks down while in transit due to wear and corrosion of the battery terminal connection. By simply cutting away the cable from the corroded terminal connection and removing the connection, my new connection is ready for service by inserting the cut end of the cable into the socket of my terminal connection and making it secure by tightening the nut. Since no flame is necessary for sweating or soldering the cable in place, the danger of igniting inflammable material, which the vehicle may be carrying, is eliminated.

Although I have described a specific constructional feature of my invention, it is obvious that changes in the size, shape and arrangement of the parts may be made to meet other requirements, without departing from the spirit and the scope of the invention as defined in the appended claims.

I claim:

1. In a terminal connection for heavy duty battery cables, a base having a top wall and side walls providing an elongated channel shaped chamber with open ends, a socket aligned with the chamber and communicating with one end and having an inlet, whereby a cable end may be received in the socket and extend into the chamber, said socket and the contiguous portion of the chamber having corrugations on the inner surfaces thereof, the top wall of the base having a stud receiving opening and the side walls each having an arcuate lower edge extending between spaced abutments, and a ring member having an upper section, a lower arcuate section, and a threaded stud extending outwardly from the upper section for passage through the base top wall opening, said upper section having a part with a flat upper surface for seating in the base and a second part in the plane of the first part having depending teeth adapted to grip a cable end in cooperation with the corrugations of the chamber and the socket, the lower arcuate ring section being wider than the upper section and providing spaced abutments at each side aligned with the base side wall abutments.

2. In the combination of claim 1, wherein said upper section ring part is provided with depending teeth flaring outwardly from the upper section.

3. In the combination of claim 2, wherein said upper section ring part is provided with depending teeth being displaced towards the lower section with respect to the abutment part of the upper section.

4. A base for a terminal battery connection having a top wall and side walls providing an elongated channel shaped chamber with open ends, a socket aligned with the chamber and communicating with one end and having an inlet, whereby a cable end may be received in the socket and extend into the chamber, said socket and the contiguous portion of the chamber having corrugations on the inner surfaces thereof, the top wall of the base having a stud receiving opening and the side walls each having an arcuate lower edge extending between spaced abutments.

5. A ring member for a terminal battery connection having an upper section, a lower arcuate section and a threaded stud extending outwardly from the upper section, said upper section having a part with a flat upper surface and a second part in the plane of the first part having depending teeth, the lower arcuate ring section being wider than the upper section and providing spaced abutments at each side.

References Cited in the file of this patent

UNITED STATES PATENTS

| | | |
|---|---|---|
| 1,787,906 | Hoover | Jan. 6, 1931 |

FOREIGN PATENTS

| | | |
|---|---|---|
| 53,374 | France | Feb. 26, 1945 |
| 447,271 | Great Britain | May 12, 1936 |
| 563,909 | Great Britain | Sept. 5, 1944 |